(12) United States Patent
Denis (10) Patent No.: US 6,409,217 B1
(45) Date of Patent: Jun. 25, 2002

(54) SAFETY-BELT ARRANGEMENT

(75) Inventor: Arnaud Denis, Lainville-en-Vexin (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 09/670,875

(22) Filed: Sep. 27, 2000

(30) Foreign Application Priority Data

Sep. 27, 1999 (GB) .............................................. 9922836

(51) Int. Cl.$^7$ .......................... B60R 22/36; A47C 31/00
(52) U.S. Cl. ...................................... 280/806; 297/480
(58) Field of Search ............................... 280/806, 807; 297/474, 475, 480, 476, 479; 242/584.1, 587.1

(56) References Cited

U.S. PATENT DOCUMENTS

| | | | | |
|---|---|---|---|---|
| 4,256,273 A | * | 3/1981 | Burleigh ..................... | 242/376 |
| 4,367,851 A | * | 1/1983 | Maeda et al. ............... | 280/807 |
| 4,583,762 A | * | 4/1986 | Carlstedt .................... | 280/807 |
| 4,729,524 A | * | 3/1988 | Befort et al. ................ | 280/806 |
| 4,856,728 A | * | 8/1989 | Schmidt et al. ............. | 280/806 |
| 4,907,757 A | * | 3/1990 | Rumpf et al. ............... | 280/807 |
| 4,991,874 A | * | 2/1991 | Tsuge et al. ................ | 280/806 |
| 5,002,236 A | * | 3/1991 | Cotter ......................... | 280/807 |
| 5,014,927 A | * | 5/1991 | Ogawa et al. ............... | 242/376 |
| 5,076,610 A | * | 12/1991 | Struck ......................... | 280/806 |
| 5,451,094 A | * | 9/1995 | Templin et al. ............. | 297/480 |
| 5,634,664 A | | 6/1997 | Seki et al. | |
| 5,799,894 A | * | 9/1998 | Kohlndorfer et al. ....... | 280/806 |
| 5,904,371 A | * | 5/1999 | Koning ........................ | 280/806 |
| 5,931,402 A | * | 8/1999 | Weller ......................... | 280/806 |
| 6,068,208 A | * | 5/2000 | Matsuki et al. ............. | 280/806 |
| 6,179,330 B1 | * | 1/2001 | Wier .......................... | 180/268 |

FOREIGN PATENT DOCUMENTS

| | | | | |
|---|---|---|---|---|
| EP | 0463186 A1 | * | 1/1992 | ........... B60R/22/44 |
| FR | 2667032 | * | 9/1990 | ........... B60R/22/02 |
| GB | 1 535 709 | | 12/1978 | |
| GB | 2 149 648 | | 6/1985 | |

* cited by examiner

Primary Examiner—Brian L. Johnson
Assistant Examiner—Joselynn Y. Sliteris
(74) Attorney, Agent, or Firm—Venable; Robert Kinberg (57) ABSTRACT

A safety-belt arrangement for a motor vehicle has a safety-belt (74) with an end fixing (73) in the form of a plate having an aperture (75). The end fixing may be inserted into a slot (72) formed in a rotatably mounted spool (55). A spring-biased catch (76) is provided which engages the aperture (75) to retain the end fixing in position. When the end fixing is in position a spring catch (70) is released permitting the spool (55) to rotate under the influence of a spring bias. If a severe force is applied to the belt (74), part of the belt is withdrawn from the spool under a force limiting effect. The spool may additionally be associated with a pre-tensioner.

33 Claims, 6 Drawing Sheets

SAFETY-BELT ARRANGEMENT

BACKGROUND OF THE INVENTION

THE PRESENT INVENTION relates to a safety-belt arrangement and more particularly relates to a safety-belt arrangement adapted for use in a motor vehicle, such as a motor car. The invention also relates to an anchoring unit for use with a safety-belt.

It is desirable to provide a safety-belt arrangement for use in a motor car which can be easily mounted in the car during fabrication of the car.

It is desirable to provide a safety-belt arrangement which can apply a tension to a safety-belt in the event that an accident should occur, so that the occupant of a seat, wearing the safety-belt, is retained firmly in the seat by the safety-belt.

It is desirable to provide a safety-belt arrangement in which when a very substantial force is applied to the safety-belt, for example when the safety-belt is decelerating, a passenger of substantial mass during an accident where a vehicle is undergoing substantial deceleration, the safety-belt should "yield" whilst providing a force-limiting effect.

SUMMARY OF THE INVENTION

The present invention seeks to provide an improved safety-belt arrangement.

According to one aspect of this invention there is provided a safety-belt arrangement for use in a motor vehicle, the arrangement comprising a safety-belt, the safety-belt carrying a tongue to co-operate with a buckle, the safety-belt carrying an end fixing, the arrangement further incorporating an anchoring unit incorporating rotatable spool, the spool being provided with a first catch to engage and retain said end fixing fast with the spool in response to a predetermined movement of the end fixing relative to the spool, means being provided to rotate the spool.

Preferably the first catch comprises a spring biased catch adapted to engage and retain the end fixing.

Conveniently the spool defines a passage into which the end fixing maybe inserted, the first catch comprising a spring biased element biased initially to a position extending part way across the passage, the element being adapted to be retracted, from the initial position, by engagement with the end fixing when the end fixing is inserted in to the passage and then, when the end fixing has been fully inserted in to the passage, being adapted to move back to the initial position to engage and retain the end fixing fast with the spool.

Preferably the means provided to rotate the spool are adapted to impart a rotational bias to the spool, and wherein a securing catch is provided to retain the spool in position, the securing catch being movable to a release position in response to the end fixing being moved to a position in which it is fixed fast with the spool, the spool thus rotating to wind in a length of safety-belt.

Advantageously means are provided to limit the degree of rotation that can be effected by the spool under said rotational bias.

Conveniently limiting means comprise a helical formation provided on the spool, and a follower adapted to follow the helical formation whilst moving in a transversely extending guide, the helical formation terminating in a stop engageable by the follower to prevent further rotation of the spool.

Preferably the spool is associated with means which enable the spool to rotate, in response to the application of a substantial force to the safety-belt after the end fixing has been connected to the spool to pay out safety-belt, with a force limiting effect.

Conveniently the means which enable the spool to rotate to pay out safety-belt with a force limiting effect comprise a torsion bar connected to said spool, rotation of the spool causing torsion to be applied to the torsion bar.

Preferably part of the torsion bar is connected to the spool and part is connected to a rotatable element that can rotate in one sense relative to a framework supporting that spool, but which is prevented from rotating in the opposite sense.

Advantageously said rotatable element comprises an end plate associated with the spool, said end plate carrying a toothed catch biased outwardly to engage corresponding teeth and intermediate recesses formed in the periphery of an aperture defined by the said framework.

Preferably the means provided to rotate the spool are adapted to pre-tension the safety-belt, said means being actuable in response to a parameter exceeding a predetermined threshold.

Conveniently the means adapted to rotate the spool are connected to the spool by means of a force limiting element.

Preferably the force limiting element is a torsion bar.

In a preferred embodiment a single torsion bar is provided, torsion being applied to one part of the torsion bar on the paying-out of safety-belt, and another portion of the torsion bar providing the force limiting effect.

Preferably a pillar loop fixing is provided on the safety-belt.

According to another aspect of this invention there is provided an anchoring unit adapted to anchor one end of a safety-belt, provided with an end fixing, the anchoring unit comprising means adapted to receive said end fixing, means adapted to wind in a predetermined length of safety-belt in response to the end fixing being received within said means in the anchoring unit, and means to pay out at least some of the wound-in length of safety-belt, against a resistive force, if the safety-belt is exposed to a force in excess of a predetermined threshold.

Preferably the means to wind in the safety-belt comprises a resiliently biased spool, the spool being provided with a catch adapted to retain the spool in a predetermined position until the end fixing on the safety-belt is connected to the spool, the end fixing being adapted to release the catch to permit rotation of the spool under the applied spring bias.

Conveniently means are provided to limit the degree of rotation that can be effected by the spool under the spring bias.

Advantageously said limiting means comprise a helical formation provided on the spool, and a follower adapted to follow the helical formation whilst moving in a transversely extending guide, the helical formation terminating in a stop engageable by the follower to prevent further rotation of the spool.

Conveniently the resistive force is provided by a torsion bar, said paying-out of safety-belt causing torsion to be applied to the torsion bar.

Preferably one part of the torsion bar is connected to the spool, and another part of the torsion bar is connected to an element that can rotate in one sense relative to a framework supporting the spool, but which is prevented from rotating in the opposite sense.

In one embodiment said element comprises an end plate associated with the spool, said end plate carrying a toothed catch biased outwardly to engage corresponding teeth and intermediate recesses formed in the periphery of an aperture defined by the said framework.

Preferably means are provided to pre-tension said safety-belt.

Conveniently the means to pre-tension the safety-belt comprise means to rotate said spool, said means comprising a torsion bar having part connected to the spool, and having part connected to a drive wheel driven by a pyrotechnic charge.

Advantageously a single torsion bar is provided, one part of the torsion bar providing said resistive force, and another part of the torsion bar extending between the spool and the drive wheel.

In the arrangement the spool may be associated with means adapted to rotate the spool in order to pre-tension the safety-belt, the means to rotate the spool comprising a torsion bar, one part of the torsion bar being connected to the spool, and another part of the torsion bar being connected to a drive wheel adapted to be driven by a pyrotechnic arrangement.

Advantageously means are provided to permit said spool to rotate in one sense, but to prevent rotation of the spool in the opposite sense.

In one embodiment said means to permit rotation of the spool in one sense comprise an element associated with the spool, said element carrying a spring biased catch, the catch being adapted to co-operate with teeth formed on the framework supporting the spool.

Conveniently the torsion bar incorporates a further section adapted to provide a resistive force whilst permitting the paying-out of some of a length of safety-belt wound round the spool, if the safety-belt is exposed to a force in excess of a predetermined threshold.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 7 is a further view which corresponds to FIG. 5 showing the illustrated components in a further subsequent configuration.

DETAILED DESCRIPTION OF THE INVENTION

Figure 1:
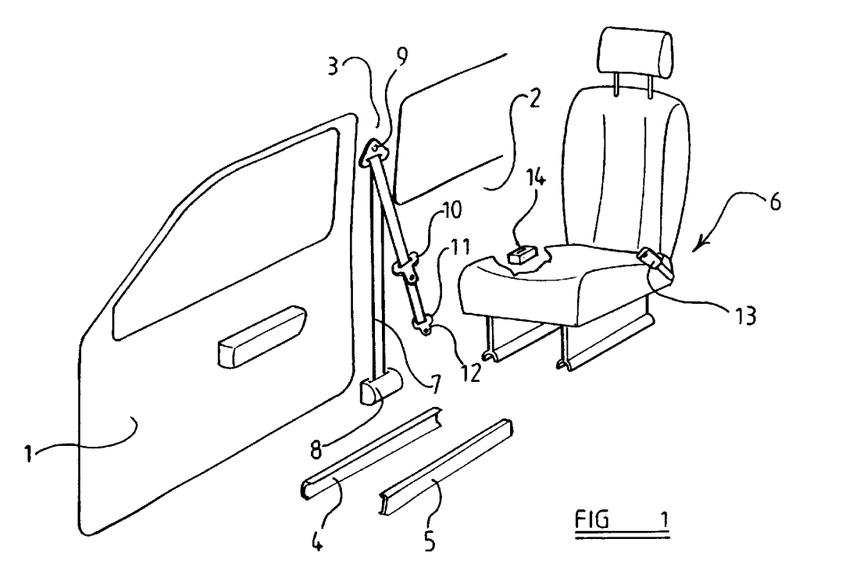
FIG. 1 is a perspective view illustrating, in an exploded manner, part of an interior of a motor vehicle and a safety-belt system.

Referring initially to FIG. 1 of the accompanying drawings, part of a motor vehicle is illustrated. In particular FIG. 1 illustrates two doors 1, 2 of a motor vehicle, there being a "B"-Post located between the two doors. The vehicle is provided with two parallel rails 4, 5 which are located in the floor of the vehicle adjacent the door 1. A seat 6 is provided adapted to be mounted on the rails 4, 5.

A seat-belt 7 is provided, one end of the seat-belt being connected to a retractor mechanism 8 which is mounted on the floor of a vehicle adjacent the lower part of the "B"-Post 3. A pillar-loop 9 is provided adjacent the top of the "B"-Post 3 and the safety-belt 7 passes through the pillar-loop. A tongue 10 is provided on the safety-belt at a position between the pillar-loop 9 and the free end 11 of the belt. The free end 11 is provided with an end fixing in the form of a second tongue 12.

Mounted on the seat 6 is a buckle 13 adapted to receive the tongue 10 provided on the belt 7. Also mounted on the seat 6 is an anchoring unit 14 adapted to receive and retain the tongue 12 provided at the free end of the belt 11.

It is to be appreciated that the arrangement described with reference to FIG. 1 facilitates the installation of a seat-belt in a motor vehicle. The seat-belt would be provided to the motor vehicle retracted on the retractor 8, but having the pillar-loop 9, and the tongue 10 already mounted in position on the belt 7. Of course, the tongue 12 provided at the free end 11 of the belt would be accessible on the exterior of the retractor mechanism 8. In order to mount the seat-belt in position in the motor vehicle, the retractor 8 needs to be secured to appropriate mounting means provided at the base of the "B"-Post 3, and the pillar-loop 9 needs to be mounted on appropriate mounting means provided adjacent the upper part of the "B"-Post 3. The seat 6 can easily be mounted on the rails 4, 5 during the final stages of manufacture of the motor vehicle. The seat-belt 7 may then be prepared for use, simply by inserting the tongue 12 into the anchoring unit 14 provided on the seat 6. Thus, there is no reason to secure the free end 11 of the seat-belt 7 directly to the motor vehicle— all that is need is for the tongue 12 to be inserted into the anchoring unit 14. The seat-belt is then ready for use. A person who is to use the seat-belt 6 sits in the seat 6, and then passes the seat-belt 7 across their body introducing the tongue 10 into the buckle 13. It is to be noted that the anchoring unit 14 is mounted on the side of the seat 6 which is adjacent the "B"-Post 3 and the buckle 13 is mounted on the side of the seat 6 which is remote from the "B"-Post 3.

The anchoring unit 14 may be adapted, as will be described hereinafter in greater detail, to provide two functions. The first function is a pre-tensioning function. In other words, the unit 14 is adapted to apply a tension to the seat-belt 7 in the event that an accident should arise, thus generally tightening the belt to help ensure that the belt retains the occupant of the seat 6 firmly in position. The second function provided by the unit 14 is a force-limited-yielding function. Thus, if a very substantial force is applied to the safety-belt 7, the unit 14 will "yield" paying-out a short length of safety-belt 7, against a resisting effect provided by a force-limiting arrangement which will be described in detail hereinafter.

Figure 2:
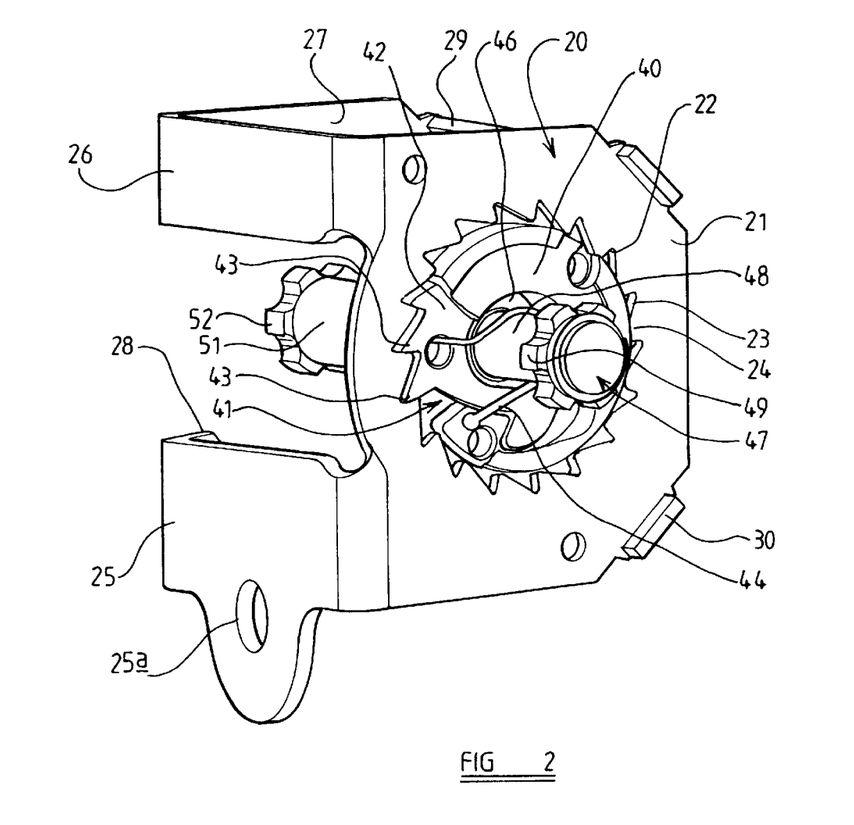
FIG. 2 is a perspective view of part of a unit forming a component an arrangement adapted to retain an end part of a safety-belt.

FIG. 2 illustrates a part of the anchoring unit 14. Referring to FIG. 2, a framework 20 is provided which presents a planar front face 21 having a centrally located aperture 22, the outer periphery of which is defined by a plurality of recesses 23 and teeth 24.

From one side of the front face 21 two arms 25, 26 extend rearwardly, the lower arm 25 being provided with an apertured lug 25a which may be used to mount the framework 20 in position on the seat 14. The rearwardly extending arms 25, 26 carry transversely extending plates 27, 28 which extend parallel with the front face 21, and the plates 27, 28 terminate with fingers 29, 20 which extend forwardly parallel with the arms 25, 26, and engage parts of the front face 21 remote from the part of the front face carrying the rearwardly extending arms 25, 26. Thus, viewed from above, the framework is of a rectangular or square form.

A part-annular end plate 40 is provided having an outer diameter slightly less than the diameter of the circle defined by the inner-most ends of the teeth 24 provided at the periphery of the aperture 22. The part annular plate 40 is located within the plane of the aperture 22. A region of the part annular end plate 40 is cut away to form a recess 41. Mounted within the recess 41 is a pivotally mounted catch 42. The catch 42 is of planar form, and lies in the plane defined by the end plate 40. The catch 42 has, at a radially outer-most position, a plurality of teeth 43 dimensioned to engage with the recesses 23 provided in the periphery of the aperture 22. The catch 42 is pivotally mounted relative to the rest of the part annular end plate 40, and a spring 44 is provided adapted to bias the catch element 42 outwardly so that teeth 43 thereof firmly engage the recesses 23 formed in the periphery of the aperture 22. It is to be appreciated, however, that the arrangement is such that if the part annular end plate 40 rotates in a clockwise direction, as shown in FIG. 2, because of the configuration of the recesses 23 and the teeth 24 provided at the periphery of the aperture 22, the catch 42 will be biased inwardly against the resilient action of the spring 44, with a ratcheting effect. However, movement of the end plate 40 in the counter-clockwise direction, as shown in FIG. 2, will be prevented by engagement of the teeth 43 of the catch 42 with the recesses 23 provided at the periphery of the aperture 22.

Figure 8:
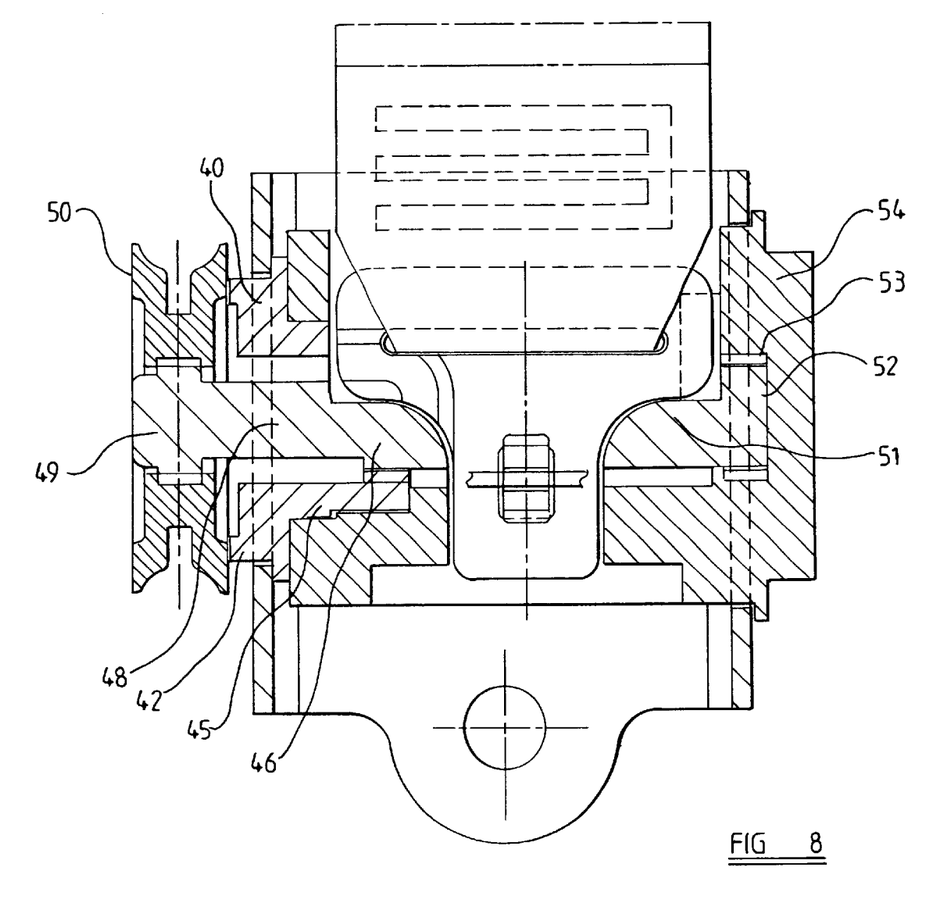
FIG. 8 is a sectional view of part of the arrangement shown in FIG. 2, and FIGS. 9A–D are diagrammatic views provided for the purpose of explanation.

The end plate 40 is provided with a central portion which extends perpendicularly to the plane of the plate, as shown most clearly in FIG. 8, to form a re-entrant portion 45 of the end plate. The inner end of the re-entrant portion is connected to an enlarged head 46 that is formed at a substantially central region of a torsion bar 47. The torsion bar 47 has a first portion 48 which extends through the re-entrant portion 45 of the end plate 40, projecting beyond the plane defined by the end plate 40, to carry a first terminal engagement head 49. The first terminal engagement head 49 is provided with protrusions around the outer periphery thereof, and as shown most clearly in FIG. 8, is adapted to engage pulley-wheel 50. As will become clear, hereinafter, the pulley-wheel 50 may be associated with a pyrotechnic arrangement adapted to provide a rotational force to rotate the pulley-wheel 50.

As mentioned previously, the enlarged head 46 provided on the torsion bar 47 is centrally located, and the torsion bar thus presents a second portion 51 which extends away from the first portion 48, terminating in a second terminal head 52, the head 52 again being provided with protrusions.

It is to be appreciated, therefore, that the torsion bar 47 comprises a substantially linear bar having, at one end, the first terminal head 49, having the central head 46 and having at the other end the second terminal head 52. The portion 48 of the torsion bar is co-axial with the portion 51 of the torsion bar. The portion 48 of the torsion bar is of lesser diameter than the portion 51 of the torsion bar for reasons which will become clear hereinafter.

The head 52 of the torsion bar is received within a co-operating recess 53 formed on the inner face of an end wall 54 of a spool or drum 55.

Figure 3:
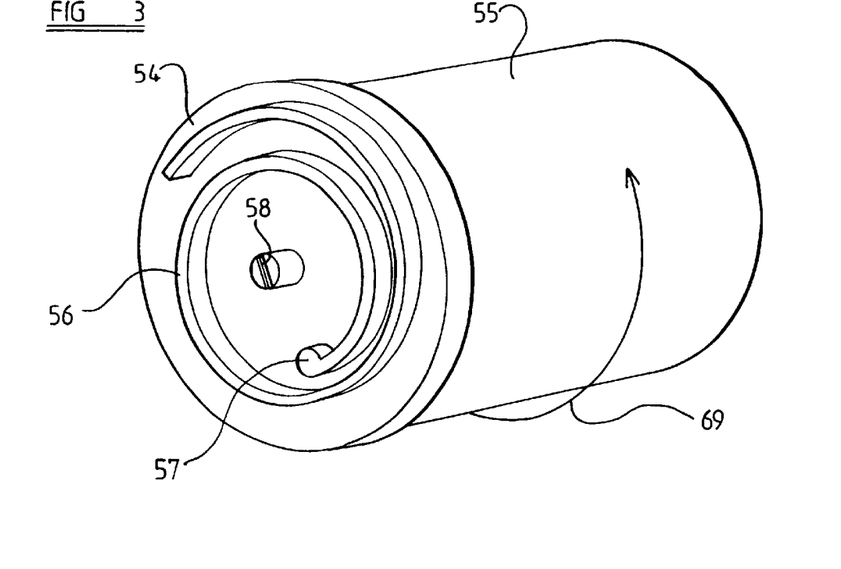
FIG. 3 is a perspective view of another component part of the unit.

As can be seen most clearly in FIG. 3, the outer face of the end wall 54 of the spool or drum is provided with a substantially helical projection 56. The inner end of the helical projection is provided with a cross-head 57.

It is to be appreciated that the spool 55 is provided, on the end wall 54, at the centre of the region defined by the helical projection 56, with a slotted projection 58.

Figure 4:
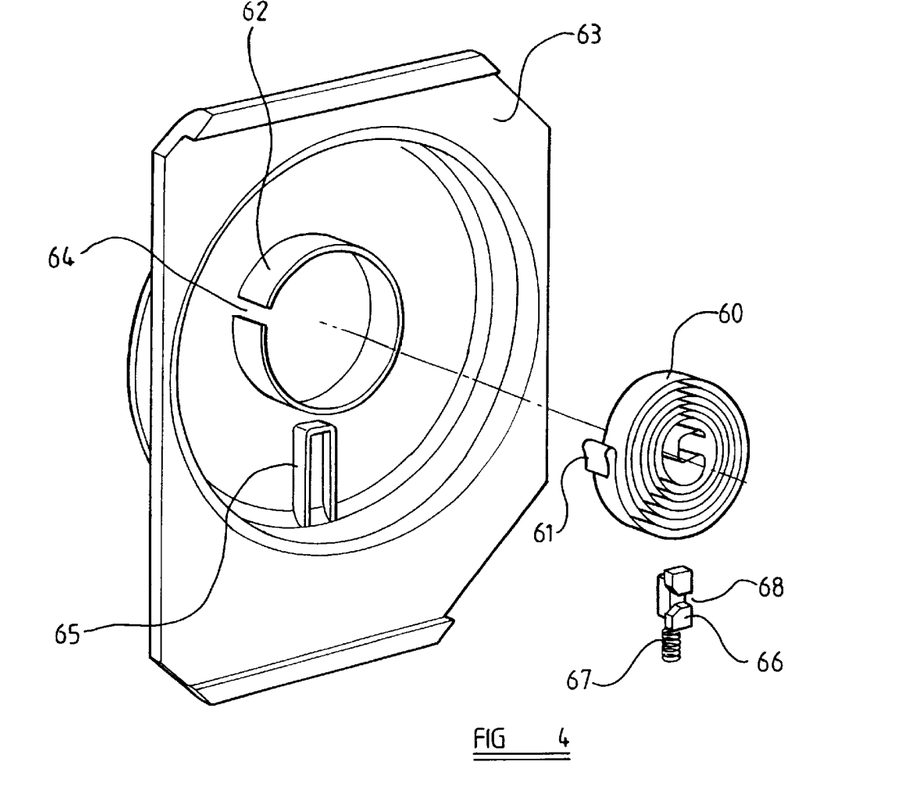
FIG. 4 is a perspective view of a further component of the unit.

The slotted projection 58 is adapted to be engaged with one inner end of a helical clock spring 60 shown in FIG. 4. The outer end of the clock spring 60 is folded back 61. The clock spring is adapted to be engaged within a recess defined by a substantially upstanding annular wall 62 formed on an end cap 63. It is to be noted that the wall 62 is provided with a slot or discontinuity 64 to enable the folded back end 61 of the spring 60 to be engaged with the wall 62. The end cap 63 is adapted to be mounted in position on the traverse plates 27, 28 of the framework 20 shown in FIG. 2.

Also formed in the inner face of the end cap 63 is a vertically extending channel 65. Received within the channel is a channel follower 66 which is biased to an upward position by a resilient spring 67. The channel follower 66 is in the form of a block of material, the block of material being provided with a horizontal transversely extending slot 68 in the face thereof that is visible as the channel follower is in position within the channel 65. The slot 68 is adapted to receive the helical projection 56 provided on the spool or drum 55, as a sliding fit.

It is thus to be appreciated that the spring 60 imparts a bias to the spool 55 tending to rotate the spool in the clockwise direction in the sense of FIG. 2, and in the sense of FIG. 4. Thus the spool is adapted to be rotated in the direction shown by the arrow 69, as shown in FIG. 3.

Referring to FIG. 8 it can be seen that the spool 55, together with the end plate 40, form an integral assembly that is supported by the framework 20 so that the spool 55 can rotate about its axis.

Figure 5:
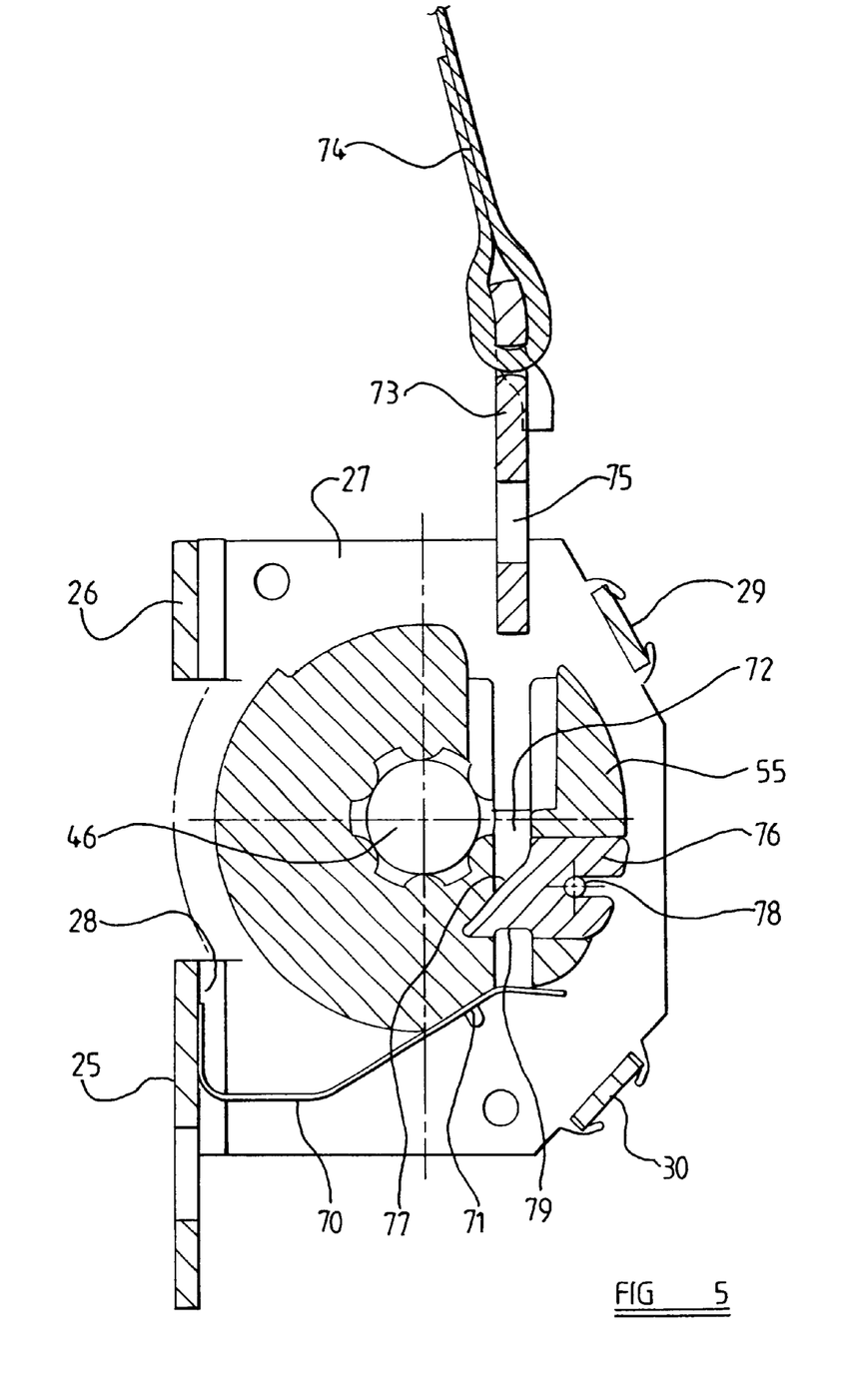
FIG. 5 is a sectional view of certain components, provided for purposes of explanation, of part of the unit shown in FIG. 2, showing the components in a first configuration, FIG. 6 corresponds to FIG. 5, but shows the illustrated components in a subsequent configuration.

At this stage reference is made to FIG. 5 of the accompanying drawings. FIG. 5 is a sectional view taken through the arrangement shown in FIG. 1, showing the arms 25, 26, and the fingers 29, 30 in section, whilst also illustrating the transverse plates 27, 28. The spool or drum 55 is shown in a sectional view, and the head 46 provided on the torsion bar 47 is illustrated. As can be seen with reference to FIG. 5, a resilient retaining clip 70 is provided, the clip 70 being mounted, at one end, on the arm 25 and having a free end which abuts against part of the periphery of the spool 55. The free end of the clip 70 is provided with an aperture which actually, in the position illustrated in FIG. 5, accommodates a peg 71 that projects outwardly from the exterior of the spool 55. The clip 70 thus prevents the spool 55 from rotating. In this condition there is a bias applied to the spool tending to rotate the spool by the spring 60 described above.

As can be seen in FIG. 5, the periphery of the spool defines a substantially circular envelope, when the spool is viewed in cross-section, but extending across the spool, in a path that is effectively a chord across the circle defined by the periphery of the spool, is a channel 72. The channel 72 is dimensioned to receive a tongue 73 connected to one end of a seat-belt 74. The tongue 73 is provided with an aperture 75 therein.

Extending across the channel 72 is a slidably mounted dog catch 76 having a chamfered upper surface 77 which is biased into position by means of a spring 78. The dog catch can move, against the spring bias, substantially perpendicularly to the axis of the channel 72.

It is to be anticipated that as the tongue 73 provided at the end of the seat-belt 74 is inserted into the channel 72, the end of the tongue 73 will engage the chamfered face 77 on the dog catch 76 moving the dog catch towards the right, as shown in FIG. 5, against the bias provided by the spring 78. As the tongue 73 continues to move through the channel 72, the dog catch will return to its initial position with part of the dog catch being accommodated within the aperture 75. The under-surface of this part of the dog catch is provided with a shallow recess 79 so that a subsequent upward force on the tongue 73 will only serve to lock the tongue 73 firmly in position. The dog catch will prevent the tongue from being withdrawn from the channel 72.

Figures 6, 7:
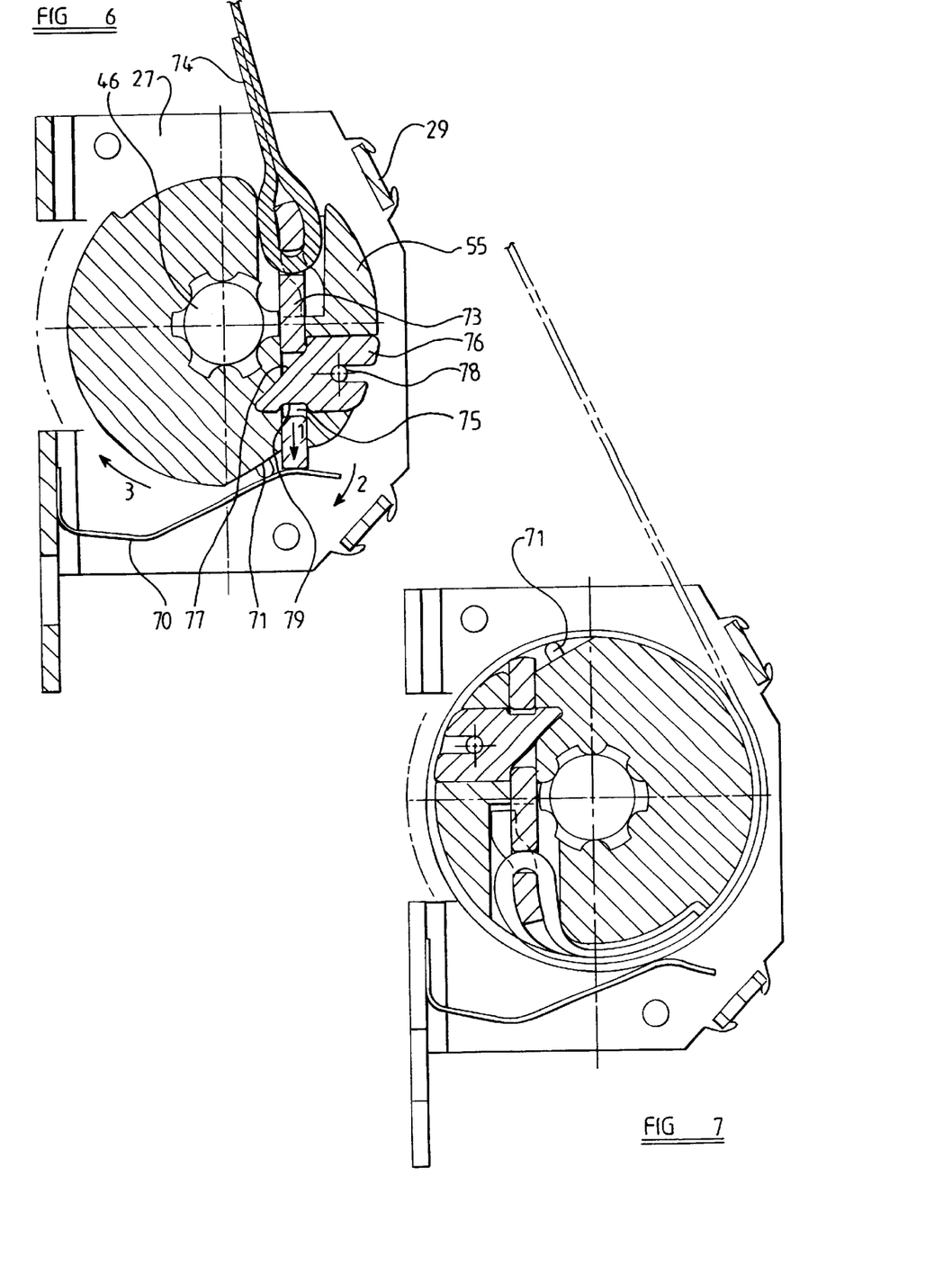

As can be seen in FIG. 6, when the tongue 73 has been inserted in position, the end part of the tongue projects beyond the free end of the channel 72 and engages the end part of the spring clip 70, moving the spring clip 70 to a position in which the peg 71 is separated from the aperture formed in the spring clip. Consequently, under the influence of the spring 60, the spool 55 commences to rotate in a clockwise direction as shown in FIGS. 5 to 7. As the spool rotates a portion of the seat-belt 74 is drawn on the to the spool and is wound on to the spool. As can be seen in FIG. 7, the seat-belt that is wound on to the spool passes over the peg 71, preventing the peg 71 from re-engaging the aperture provided in the free end of the spring clip 70 when the spool has completed one rotation from its initial position.

It is thus to be understood that as a direct consequence of inserting the tongue 73 provided at the end of the seat-belt 74 into the channel 72, the spool 55 has been caused to rotate, thus winding on to the spool a length of safety-belt 74.

Figure 9A:
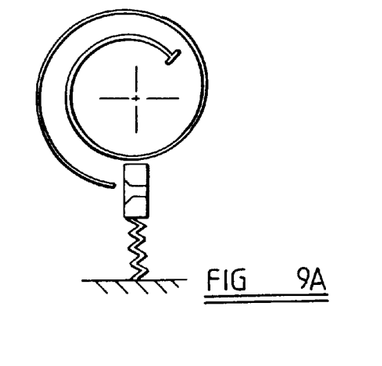
Figure 9B:
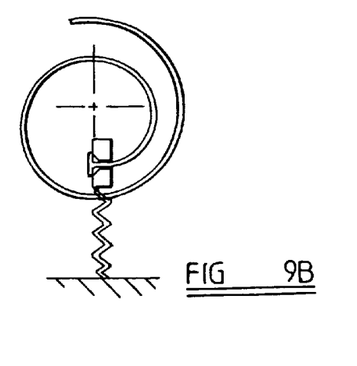

It is to be understood, however, that as the spool has rotated, so the channel follower 66 has been moved radially inwardly, following the helical projection 56 formed on the end wall 54 of the spool 55. The channel follower 66 will effectively follow the helical projection 56 from an initial position as shown on FIG. 9A to a terminal position as shown in FIG. 9B in which the channel follower engages the cross-head head 57 provided at the inner end of the helical projection 56 which acts as a stop. When this situation obtains, further rotation of the spool 55 in the direction of the arrow 69 is prevented.

In the event an accident should occur, a sensor will sense that a parameter, such as an acceleration or applied "G" force, has exceeded a predetermined threshold and will activate a pyrotechnic device which drives the pulley 50, as shown in FIG. 8, in such a direction that the engagement head 49 of the torsion bar 47 is moved in a clockwise direction as shown in FIG. 2. This will apply a rotation to the portion 48 of the torsion bar 47 between the engagement head 49 and the enlarged head 46. This, in turn, will rotate not only arcuate end plate 40, but also the portion 51 of the torsion bar between the enlarged head 46 and the head 52 that is connected to the end wall 54 of the spool 55. Thus, as a consequence of the pyrotechnic device being activated, and as a result of the rotation of the pulley 50, the end plate 40 rotates in a clockwise direction as shown in FIG. 2, with a consequent "ratcheting" of the catch 42, and the spool 55 is simultaneously rotated in the direction of the arrow 69 as shown in FIG. 3. This occurs because the force applied to the torsion bar by the pulley-wheel 50 is sufficient to break either the cross-head 57 provided at the end of the helical projection 56 on the end wall 54 of the spool 55, or the channel follower 66 or the channel 65. This rotation of the spool tends to wind in, on the spool 55, more of the seat-belt 74. Thus, a tension is applied to the seat-belt 74. It is to be appreciated that once the seat-belt has been wound on to the spool, the teeth 43 of the catch 42 will again engage the immediately adjacent recesses 23 provided in the periphery of the aperture 22, thus locking the annular end plate 40 in its new position.

It is to be appreciated that is the force applied to the pulley-wheel 50 if very great, and is sufficiently great that the tension applied to the seat-belt by that force would be sufficient to injure the occupant of the seat, the first portion 48 of the torsion bar 47 between the head 49 and the head 46 thereof will yield, with a consequent deformation of that part of the torsion bar. Thus, the first portion of the torsion bar serves the purpose of limiting the amount of force that can be applied to the spool 55 by the pulley-wheel 50.

It is to be appreciated that before or after actuation of the pyrotechnic device associated with the pulley-wheel 50, the described arrangement will provide the effect that if the safety-belt is subjected to a very high force, tending to withdraw the safety-belt from the described unit, a portion of safety-belt will be paid out from the unit against a resistive force. Thus, if a very high force is applied to the spool 55, tending to withdraw safety-belt, that is to say a force tending to rotate the spool in a counter-clockwise direction as shown in FIG. 2, (i.e. in a sense opposite to that of the arrow 69 as shown in FIG. 3) the head 52 of the torsion bar 47 will tend to rotate in the counter-clockwise direction as shown in FIG. 2, thus tending to impart a counter-clockwise rotation to the head 46 of the torsion bar. However, because the head 46 of the torsion bar is securely connected to the re-entrant portion of the end plate 40, and because rotation of the end plate 40 in the counter-clockwise direction is prevented by engagement of the teeth 43 of the catch 42 with the recesses 23 provided at the periphery of the aperture 22 formed in the front face 21 of the support frame 20, movement of the spool 55, and the head 52 of the torsion bar in the counter-clockwise direction is only permitted with consequent twisting of the portion 51 of the torsion bar between the head 52 and the enlarged head 46. Thus, it is to be understood that a portion of the safety-belt present on the spool may be paid out, but only against a resistive force provided by the portion 51 of the torsion bar as it is twisted or deformed.

Figure 9C:
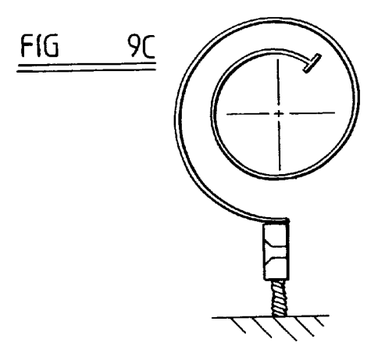
Figure 9D:
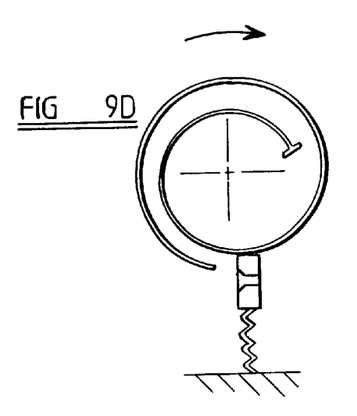

As the belt is paid out (if pre-tensioning has not been effected), the channel follower 66 will extend radially outwardly as the end wall of the spool 55 carrying the helical projection 56 rotates, generally as shown in FIGS. 9C and 9D, with the channel follower becoming disengaged from the helical projection.

It is thus to be appreciated, reverting to FIG. 1, that when a unit as described with reference to FIGS. 2 and 9 is utilised as the unit 14, as the free end of the safety-belt 7 is engaged with the unit, a length of safety-belt is wound into the unit. This means that the unit is immediately able, should an appropriate situation arise, to pay out that length of safety-belt against the resistive force provided by the portion 51 of the torsion bar. Also it is to be appreciated that the unit, as described above, is capable of pre-tensioning the safety-belt in response to an accident situation.

What is claimed is:

1. A safety-belt arrangement for use in a motor vehicle, the arrangement comprising a safety-belt, the safety-belt carrying a tongue to co-operate with a buckle, the safety-belt carrying an end fixing, the arrangement further incorporating an anchoring unit incorporating rotatable spool, the spool being provided with a first catch to engage and retain said end fixing fast with the spool in response to a predetermined movement of the end fixing relative to the spool, means being provided to rotate the spool.

2. An arrangement according to claim 1 wherein the first catch comprises a spring biased catch adapted to engage and retain the end fixing.

3. An arrangement according to claim 2 wherein the spool defines a passage into which the end fixing may be inserted, the first catch comprising a spring biased element biased initially to a position extending part way across the passage, the element being adapted to be retracted, for the initial position, by engagement with the end fixing when the end fixing is inserted in to the passage and then, when the end fixing has been fully inserted in to the passage, being adapted to move back to the initial position to engage and retain the end fixing fast with the spool.

4. An arrangement according to claim 1 wherein the means provided to rotate the spool are adapted to impart a rotational bias to the spool, and wherein a securing catch is provided to retain the spool in position, the securing catch being movable to a release position in response to the end fixing being moved to a position in which it is fixed fast with the spool, the spool thus rotating to wind in a length of safety-belt.

5. An arrangement according to claim 4 wherein means are provided to limit the degree of rotation that can be effected by the spool under said rotational bias.

6. An arrangement according to claim 5 wherein the limiting means comprise a helical formation provided on the spool, and a follower adapted to follow the helical formation whilst moving in a transversely extending guide, the helical formation terminating in a stop engageable by the follower to prevent further rotation of the spool.

7. An arrangement according to claim 1 wherein the spool is associated with means which enable the spool to rotate, in response to the application of a substantial force to the safety-belt after the end fixing has been connected to the spool to pay out safety-belt, with a force limiting effect.

8. An arrangement according to claim 7 wherein the means which enable to spool to rotate to pay out safety-belt with a force limiting effect comprise a torsion bar connected to said spool, rotation of the spool causing torsion to be applied to the torsion bar.

9. An arrangement according to claim 8 wherein part of the torsion bar is connected to the spool and part is connected to a rotatable element that can rotate in one sense relative to a framework supporting that spool, but which is prevented from rotating in the opposite sense.

10. An arrangement according to claim 9 wherein said rotatable element comprises an end plate associated with the spool, said end plate carrying a toothed catch biased outwardly to engage corresponding teeth and intermediate recesses formed in the periphery of an aperture defined by said framework.

11. An arrangement according to claim 8, wherein the means provided to rotate the spool are adapted to pre-tension the safety-belt, said means being actuable in response to a parameter exceeding a predetermined threshold.

12. An arrangement according to claim 11 wherein a single torsion bar is provided, torsion being applied to one part of the torsion bar on the paying-out of safety-belt, and another portion of the torsion bar providing the force limiting effect.

13. An arrangement according to claim 1 wherein the means provided to rotate the spool are adapted to pre-tension the safety-belt, said means being actuable in response to a parameter exceeding a predetermined threshold.

14. An arrangement according to claim 13 wherein the means adapted to rotate the spool are connected to the spool by means of a force limiting element.

15. An arrangement according to claim 14 wherein the force limiting element is a torsion bar.

16. An arrangement according to claim 1 wherein a pillar loop fixing is provided on the safety-belt.

17. An arrangement according to claim 1 wherein the spool is associated with means adapted to rotate the spool in order to pre-tension the safety-belt, means to rotate the spool comprising a torsion bar, one part of the torsion bar being connected to the spool, and another part of the torsion bar being connected to a drive wheel adapted to be driven by a pyrotechnic arrangement.

18. An arrangement according to claim 17 wherein means are provided to permit said spool to rotate in one sense, but to prevent rotation of the spool in the opposite sense.

19. An arrangement according to claim 18 wherein said means to permit rotation of the spool in one sense comprise an element associated with the spool, said element carrying a spring biased catch, the catch being adapted to co-operate with teeth formed on the periphery of an aperture defined by the framework supporting the spool.

20. A unit according to claim 17 wherein the torsion bar incorporates a further section adapted to provide a resistive force whilst permitting the paying-out of some of a length of safety-belt wound round the spool, if the safety-belt is exposed to a force in excess of a predetermined threshold.

21. An anchoring unit to anchor one end of a safety-belt, provided with an end fixing, the anchoring unit comprising means to receive said end fixing, means to wind in a predetermined length of safety-belt in response to the end fixing being received within said means in the anchoring unit, and means to pay out at least some of the wound-in length of safety-belt, against a resistive force, if the safety-belt is exposed to a force in excess of a predetermined threshold.

22. A unit according to claim 21 wherein the means to wind in the safety-belt comprises a resiliently biased spool, the spool being provided with a catch adapted to retain the spool in a predetermined position until the end fixing on the safety-belt is connected to the spool the end fixing being adapted to release the catch to permit rotation of the spool under an applied spring bias.

23. A unit according to claim 22 wherein means are provided to limit the degree of rotation that can be effected by the spool under the spring bias.

24. A unit according to claim 23 wherein said limiting means comprise a helical formation provided on the spool, and a follower adapted to follow the helical formation whilst moving in a transversely extending guide, the helical formation terminating in a stop engageable by the follower to prevent further rotation of the spool.

25. A unit according to claim 22, wherein the resistive force is provided by a torsion bar, said paying-out of safety-belt causing torsion to be applied to the torsion bar.

26. A unit according to claim 25 wherein one part of the torsion bar is connected to the spool, and another part of the torsion bar is connected to an element that can rotate in one sense relative to a framework supporting the spool, but which is prevented from rotating in the opposite sense.

27. A unit according to claim 26 wherein said element comprises an end plate associated with the spool, said end plate carrying a toothed catch biased outwardly to engage corresponding teeth and intermediate recesses formed in the periphery of an aperture defined said framework.

28. A unit according to claim 22, wherein means are provided to pre-tension said safety-belt.

29. A unit according to claim 28 wherein the means to pre-tension the safety-belt comprise means to rotate said spool, said means comprising a torsion bar having part connected to the spool, and having part connected to a drive wheel driven by a pyrotechnic charge.

30. A unit according to claim 21 wherein the resistive force is provided by a torsion bar, said paying-out of safety-belt causing torsion to be applied to the torsion bar.

31. A unit according to claim 30, wherein the means to pre-tension the safety-belt comprise means to rotate said spool, said means comprising a torsion bar having part connected to the spool, and having part connected to a drive wheel driven by a pyrotechnic charge.

32. A unit according to claim 31 wherein a single torsion bar is provided, one part of the torsion bar providing said resistive force, and another part of the torsion bar extending between the spool and the drive wheel.

33. A unit according to claim 21 wherein means are provided to pre-tension said safety-belt.

* * * * *